(12) United States Patent
Reddy Pilli et al.

(10) Patent No.: US 12,025,508 B2
(45) Date of Patent: Jul. 2, 2024

(54) SYSTEM AND METHOD FOR MONITORING A CONTAINER ENVIRONMENT

(71) Applicant: Carrier Corporation, Palm Beach Gardens, FL (US)

(72) Inventors: Srinivasa Reddy Pilli, Hyderabad (IN); Natalia Andreyeva, Beverly, MA (US); Vinay Kumar Vinnakota, Hyderabad (IN)

( * ) Notice: Subject to any disclaimer, the term of this patent is extended or adjusted under 35 U.S.C. 154(b) by 318 days.

(21) Appl. No.: 17/302,159

(22) Filed: Apr. 26, 2021

(65) Prior Publication Data

US 2021/0341340 A1 Nov. 4, 2021

Related U.S. Application Data

(60) Provisional application No. 62/704,311, filed on May 4, 2020.

(51) Int. Cl.
| | |
|---|---|
| *G01K 7/18* | (2006.01) |
| *G01K 1/02* | (2021.01) |
| *G01K 1/024* | (2021.01) |
| *G01K 1/14* | (2021.01) |
| G01D 11/00 | (2006.01) |
| G01D 21/02 | (2006.01) |

(52) U.S. Cl.
CPC ............... *G01K 7/18* (2013.01); *G01K 1/024* (2013.01); *G01K 1/026* (2013.01); *G01K 1/14* (2013.01); *G01D 11/00* (2013.01); *G01D 21/02* (2013.01)

(58) Field of Classification Search
CPC .......... G01K 7/18; G01K 1/024; G01K 1/026; G01K 1/14; G01D 11/00; G01D 21/02
See application file for complete search history.

(56) References Cited

U.S. PATENT DOCUMENTS

| | | | | |
|---|---|---|---|---|
| 9,073,759 | B2 * | 7/2015 | Zeng | C01B 33/1585 |
| 9,566,758 | B2 * | 2/2017 | Cheung | B64C 1/00 |
| 9,846,086 | B1 * | 12/2017 | Robinson | G01K 3/04 |
| 9,903,673 | B1 * | 2/2018 | Dirks | A61L 2/10 |
| 10,996,207 | B1 * | 5/2021 | Taheri | B65D 85/72 |
| 11,772,867 | B2 * | 10/2023 | Hutt | B32B 37/12 |
| | | | | 206/459.1 |
| 2004/0247016 | A1 * | 12/2004 | Faries | A61M 5/445 |
| | | | | 374/E11.018 |
| 2005/0241978 | A1 * | 11/2005 | Plue | B65D 81/3858 |
| | | | | 206/523 |
| 2008/0161693 | A1 * | 7/2008 | Prager | A61B 8/10 |
| | | | | 600/459 |

(Continued)

*Primary Examiner* — Nathaniel T Woodward
*Assistant Examiner* — Philip L Cotey

(57) ABSTRACT

A system and method for monitoring a container environment using a control device for communicably coupling a data collection unit and an external device, the data collection unit having one or more openings for receiving one or more containers and configured to: monitor parameters of the at least one container; compare the monitored parameters with predetermined upper or lower limits; detect that the monitored parameters are within the predetermined upper or lower limits and indicate an in-range condition; detect that the monitored parameters exceed the predetermined upper or lower limits and indicate an out-of-range condition; and transmit, to the external device, a signal indicative of at least one of the in-range condition and the out-of-range condition.

13 Claims, 5 Drawing Sheets

(56) References Cited

U.S. PATENT DOCUMENTS

| | | | | |
|---|---|---|---|---|
| 2011/0217487 | A1* | 9/2011 | Masciambruni | G01K 13/20 |
| | | | | 428/29 |
| 2014/0266712 | A1* | 9/2014 | Bobo | G06Q 10/06 |
| | | | | 340/539.26 |
| 2016/0128623 | A1* | 5/2016 | Bhat | A61B 5/6892 |
| | | | | 600/587 |
| 2016/0131533 | A1* | 5/2016 | Parker | G01K 1/14 |
| | | | | 374/150 |
| 2016/0299075 | A1* | 10/2016 | Willuweit | G01N 21/645 |
| 2017/0183870 | A1* | 6/2017 | Cheung | B64C 3/48 |
| 2017/0217655 | A1* | 8/2017 | Hutt | B65D 71/0014 |
| 2017/0229000 | A1* | 8/2017 | Law | G06K 19/0717 |
| 2017/0320054 | A1* | 11/2017 | Crum | B01L 9/06 |
| 2018/0224150 | A1* | 8/2018 | Lewis | F25D 29/008 |
| 2018/0365964 | A1* | 12/2018 | Carson | G01K 1/022 |
| 2019/0185237 | A1* | 6/2019 | Greenberg | G08C 17/02 |
| 2019/0262230 | A1* | 8/2019 | Bentkovski | A61J 1/1418 |
| 2019/0362303 | A1* | 11/2019 | Lawler, Jr. | G09F 3/0291 |
| 2019/0383649 | A1* | 12/2019 | Abdo | B41M 5/502 |
| 2020/0172309 | A1* | 6/2020 | Hutt | G01K 1/14 |
| 2023/0093699 | A1* | 3/2023 | Hutt | B65D 5/00 |
| | | | | 206/459.1 |

* cited by examiner

SYSTEM AND METHOD FOR MONITORING A CONTAINER ENVIRONMENT

CROSS REFERENCE TO A RELATED APPLICATION

The application claims the benefit of U.S. Provisional Application No. 62/704,311 filed May 4, 2020, the contents of which are hereby incorporated in their entirety.

BACKGROUND

The subject matter disclosed herein relates to monitoring a container, and more specifically to monitoring the internal and external environment of a container in which consumable products may be stored and transported.

A variety of products are packaged and transported from one place to another. Some products may be stored in a container, and may also be sensitive to environmental factors such as temperature, humidity, pressure, etc. Manufacturers of products, such as vaccines or other medicines, may determine that certain environmental conditions in the form of predetermined limits and/or ranges must be maintained to ensure that the product remains usable and/or consumable. When predetermined limits are exceeded or not maintained, the integrity of the product may be at risk due to possible changes in chemical composition, discoloration or general degradation.

Existing solutions may only monitor environmental conditions that are external to a container (e.g., external temperature); however, without knowing the internal temperature of the product medical professionals and consumers may be forced to make less-informed decisions about whether or not to use or consume the product. In addition, current methods provide for use of entirely disposable packaging generating waste and impacting our environment.

What is needed, then, is an effective and environmentally friendly solution for monitoring the internal and/or external environmental condition of a container.

BRIEF DESCRIPTION

According to one non-limiting embodiment, a system for monitoring a container environment, the system including: a control device communicably coupling a data collection unit to an external device; the data collection unit including one or more openings for receiving one or more containers and configured to: monitor parameters of the at least one container; compare the monitored parameters with predetermined upper or lower limits; detect that the monitored parameters are within the predetermined upper or lower limits and indicate an in-range condition; detect that the monitored parameters exceed the predetermined upper or lower limits and indicate an out-of-range condition; and transmit, to the external device, a signal indicative of at least one of the in-range condition and the out-of-range condition.

In addition to one or more of the features described above, or as an alternative, in further embodiments, the container monitoring system wherein an environmental condition comprises at least one of a temperature, a humidity, and a pressure.

In addition to one or more of the features described above, or as an alternative, in further embodiments, the container monitoring system wherein the data collection unit comprises a flexible substrate.

In addition to one or more of the features described above, or as an alternative, in further embodiments, the container monitoring system wherein the data collection unit having a plurality of sensors, is programmable to permit at least one of: a user to change the state of one or more sensors to an on-state or an off-state, and independent sensing of each container removably coupled to the data collection unit.

In addition to one or more of the features described above, or as an alternative, in further embodiments, the container monitoring system wherein at least a first sensor of the plurality of sensors comprises a thermal sensing device.

In addition to one or more of the features described above, or as an alternative, in further embodiments, the container monitoring system wherein the thermal sensing device comprises at least one of a resistance temperature detector, a platinum resistance thermometer and an electrochromic sensor.

In addition to one or more of the features described above, or as an alternative, in further embodiments, the container monitoring system wherein at least one of the resistance temperature detector and the platinum resistance thermometer is disposed within at least one opening of the data collection unit to provide a degree of contact with at least one container.

In addition to one or more of the features described above, or as an alternative, in further embodiments, the container monitoring system wherein the electrochromic sensor is communicably coupled to at least one of the temperature resistance detector and the platinum resistance thermometer.

In addition to one or more of the features described above, or as an alternative, in further embodiments, the container monitoring system wherein the external device comprises a computer, a mobile device and a cloud server.

In addition to one or more of the features described above, or as an alternative, in further embodiments, the container monitoring system wherein the data collection unit is further configured to: store in the data collection unit and the control device, parameters that quantify predetermined upper or lower limits indicative of at least one of an internal and external environmental condition of at least one container.

According to another non-limiting embodiment, an apparatus for monitoring containers in transit, the apparatus including: a data collection unit including: one or more openings for receiving one or more containers wherein a sensor is disposed in at least one of an interior surface of an opening and an edge of an opening, and the sensor is arranged to monitor the environmental condition of one or more received containers; a control device communicably coupled to the data collection unit for transmitting, to an external device, a signal indicative of an environmental condition of the one or more received containers.

In addition to one or more of the features described above, or as an alternative, in further embodiments, an apparatus wherein the data collection unit comprises a flexible substrate.

In addition to one or more of the features described above, or as an alternative, in further embodiments, an apparatus wherein a sensor includes at least one of a thermal sensor, a humidity sensor, a pressure sensor.

In addition to one or more of the features described above, or as an alternative, in further embodiments, an apparatus wherein the thermal sensor includes at least one of a resistance temperature detector, a platinum resistance thermometer and an electrochromic sensor.

In addition to one or more of the features described above, or as an alternative, in further embodiments, an apparatus wherein a first thermal sensor includes at least one of the resistance temperature detector and the platinum resistance thermometer, is disposed in the interior surface of the opening and communicably coupled to an electrochromic sensor disposed at the edge of the opening.

According to another non-limiting embodiment, a method for monitoring an environmental condition of a container using a container monitoring system including a data collection unit, the method including: storing parameters that quantify predetermined upper or lower limits indicative of at least one of an internal and external environmental condition of the container; monitoring parameters of the container; comparing the monitored parameters to the predetermined upper or lower limits; detecting that the monitored parameters are within predetermined upper or lower limits and indicating an in-range condition; detecting that the monitored parameters exceed the predetermined upper or lower limits and indicating an out-of-range condition; and transmitting, to an external device, a signal indicative of at least one of the in-range condition and the out-of-range condition.

In addition to one or more of the features described above, or as an alternative, in further embodiments, the method wherein the data collection unit is configured to have a plurality of sensing devices configured to monitor and detect at least one of an internal and external environmental condition of the at least one container.

In addition to one or more of the features described above, or as an alternative, in further embodiments, the method wherein the plurality of sensing devices comprises at least a thermal sensing device.

In addition to one or more of the features described above, or as an alternative, in further embodiments, the method wherein the thermal sensing device comprises at least one of a resistance temperature detector, a platinum resistance thermometer and an electrochromic sensor.

In addition to one or more of the features described above, or as an alternative, in further embodiments, wherein the external device comprises a computer, a mobile device and a cloud server.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings.

DETAILED DESCRIPTION

The present invention is applicable in various fields such as, but not limited to, the pharmaceutical industry, cosmetics industry, food industry and any such industry producing environmentally sensitive product.

Figure 1:
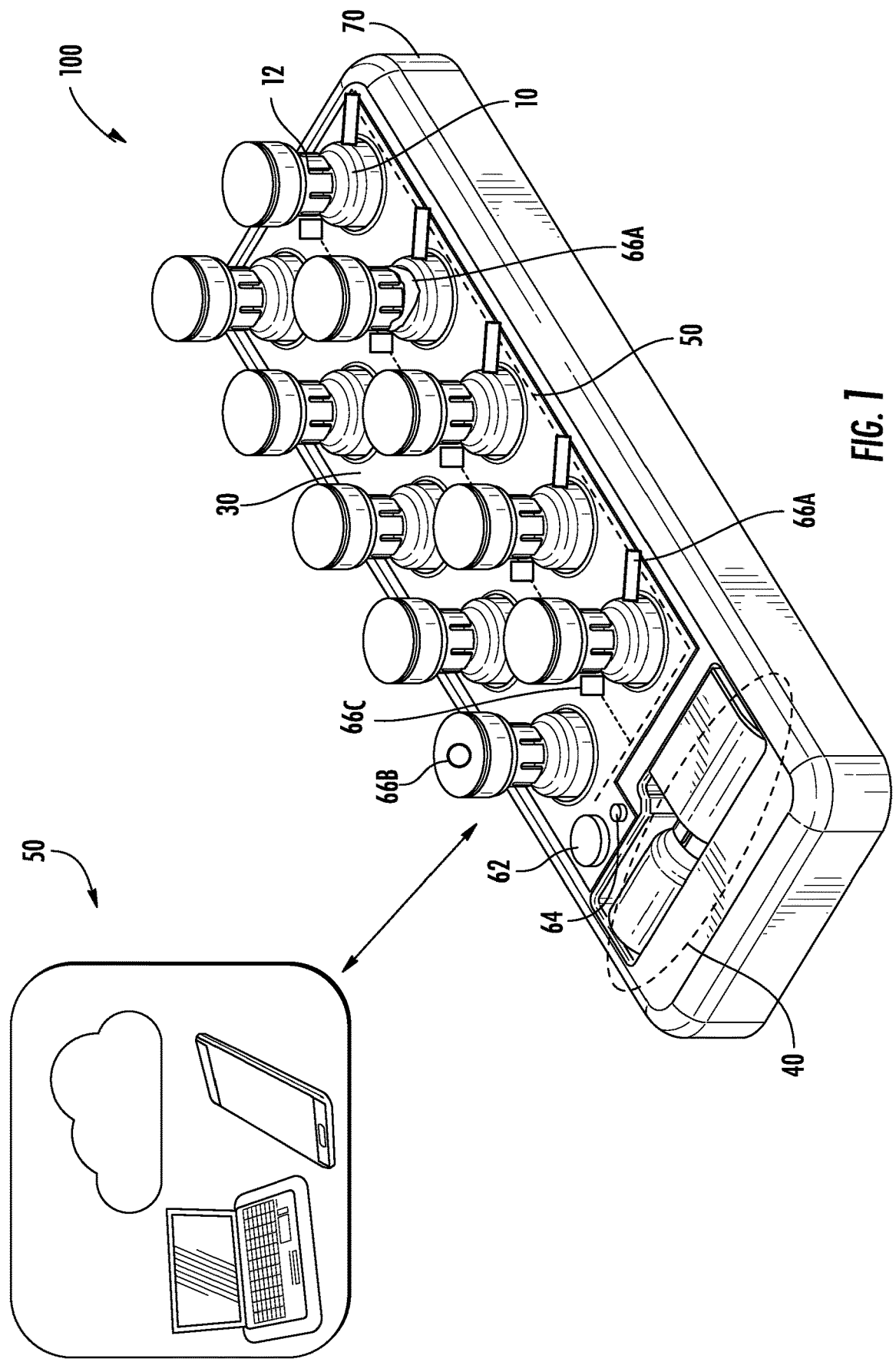
FIG. 1 is a perspective view of the container monitoring system in accordance with embodiments of the disclosure.

Referring to FIG. 1, a container 10 may include a device used to store or transport product. A container 10 may include a rigid container, such as a bottle or vial, or a flexible container, such as a bag. In some embodiments, the container 10 may have a cap or other closure system 12, such as an external metal (e.g., aluminum) crimp, to protect the integrity of the product. Although this disclosure may generally relate to product such as liquid product (e.g., vaccines, intravenous solutions, antibiotics, other drugs, blood, etc.), and/or eatable product (e.g., tablets, encapsulated medicines, supplements, etc.), lotions, and creams, for use or consumption by a patient (e.g., human, animal), it should be evident to one skilled in the art that the present disclosure is not limited to the specific examples given and could be utilized in other systems where it may be desirable to monitor the internal and/or external environmental condition of a container 10.

Consumer products, such as medicines, are generally manufactured by a laboratory and then stored in a container 10, such as a vial, for storage and shipping to a variety of locations (e.g., hospitals, medical offices, etc.). Some product requires shipping and storage under strict environmental guidelines to ensure that the product will not degrade or cause harm when ingested or used. Typically, the shipment and delivery process requires that the product be maintained in accordance with the manufacturer's specifications which may include limits on a range of environmental conditions (e.g., temperature, humidity, pressure, etc.).

A container monitoring system 100 as shown in FIG. 1, and as discussed below, can help ensure that product is safe to use or consume. In addition, the container monitoring system 100 also provides an environmentally-friendly solution to the problem of disposable shipping and storage materials. Typically, a container 10 is stored and shipped in a disposable enclosure (e.g., box, tray, etc.). The container monitoring system 100 includes a reusable data collection unit 30 and a control device 40 that can be returned to the manufacturer for reuse once the product has been used and the container 10 has been emptied and removed from the data collection unit 30.

As discussed below, monitoring of an environmental condition may occur when a container 10 is removably coupled to the data collection unit 30. The data collection unit 30 may include one or more individual sensors or a sensor array configured to detect at least one environmental condition pertaining to a container 10. A monitored condition may include an internal and/or external environmental condition such as heat, pressure, and humidity.

The container monitoring system 100 is configured to have stored therein parameters that quantify predetermined upper or lower limits indicative of at least one of an internal and external environmental condition of at least one container. The container monitoring system 100 is configured to detect at least one environmental parameter, and to determine whether an environmental parameter has been maintained and/or exceeded. In some embodiments, the data collection unit 30 may be separable from control device 40. In alternate embodiments, the data collection unit 30 and control device 40 may be combined into a single unit or device. The container monitoring system 100 is further configured to transmit via a wired or wireless technology to an external device 50, a signal indicative of at least one of an in-range environmental condition or an out-of-range environmental condition, thereby providing information about a container 10 and its product to a manufacturer, medical facility, or an end-user.

Figure 2:
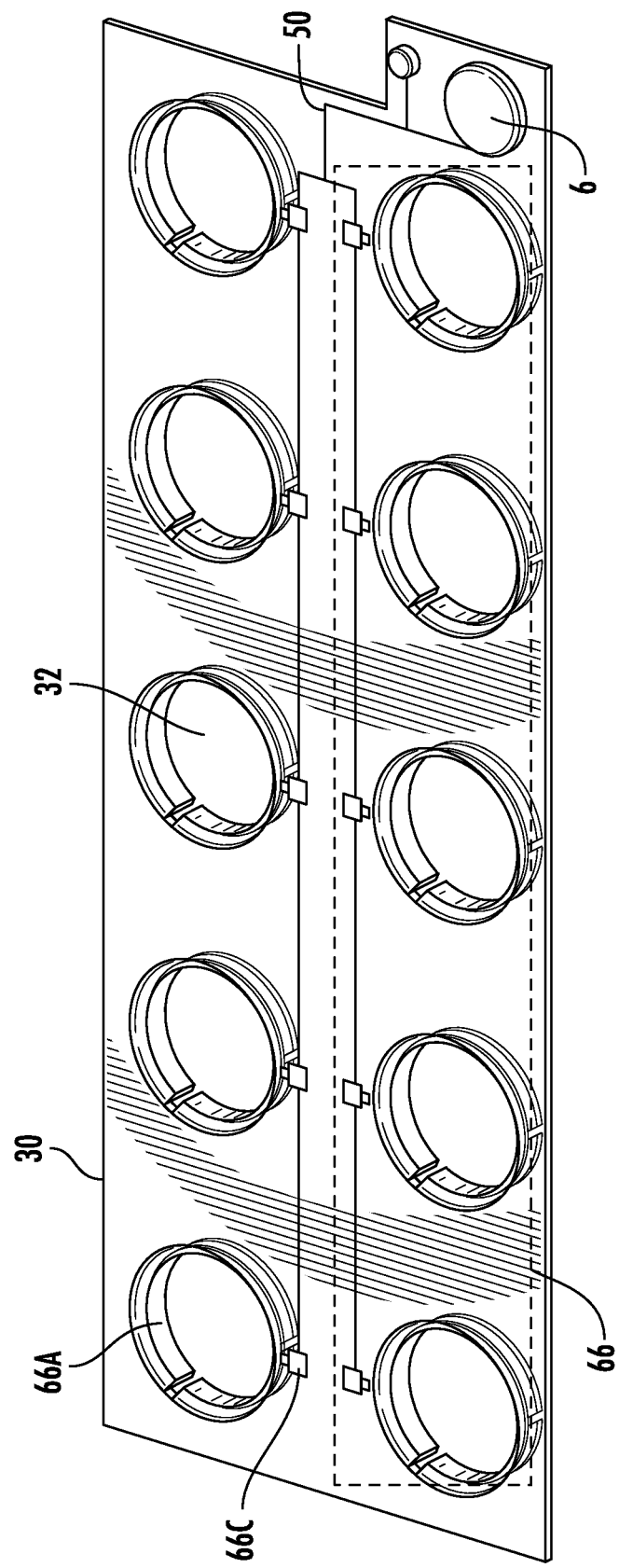
FIG. 2 is a perspective view of a portion of the container monitoring system in accordance with embodiments of the disclosure.
Figure 3:
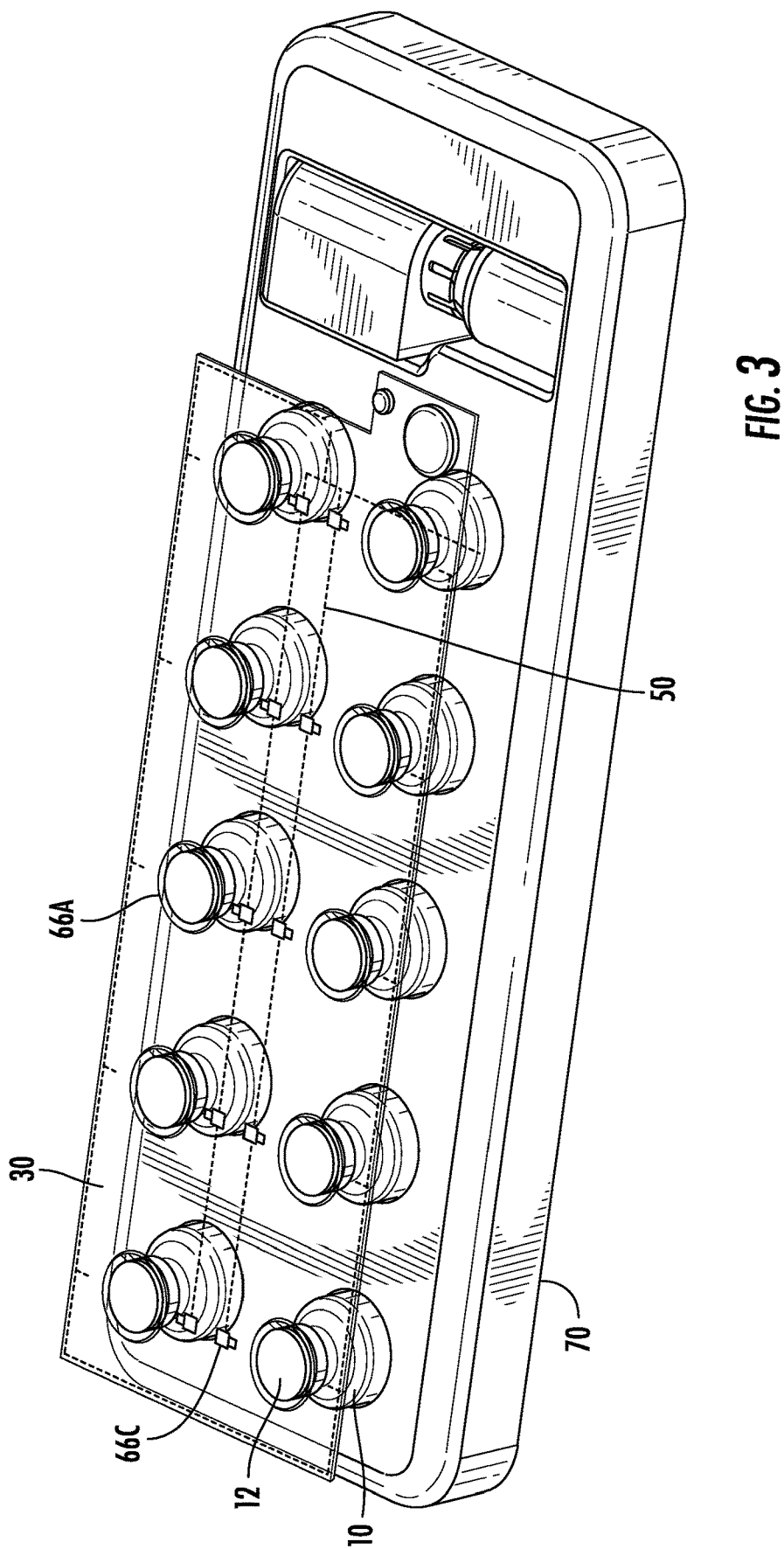
FIG. 3 is a perspective view of a portion of the container monitoring system in accordance with the embodiments of the disclosure.
Figure 4:
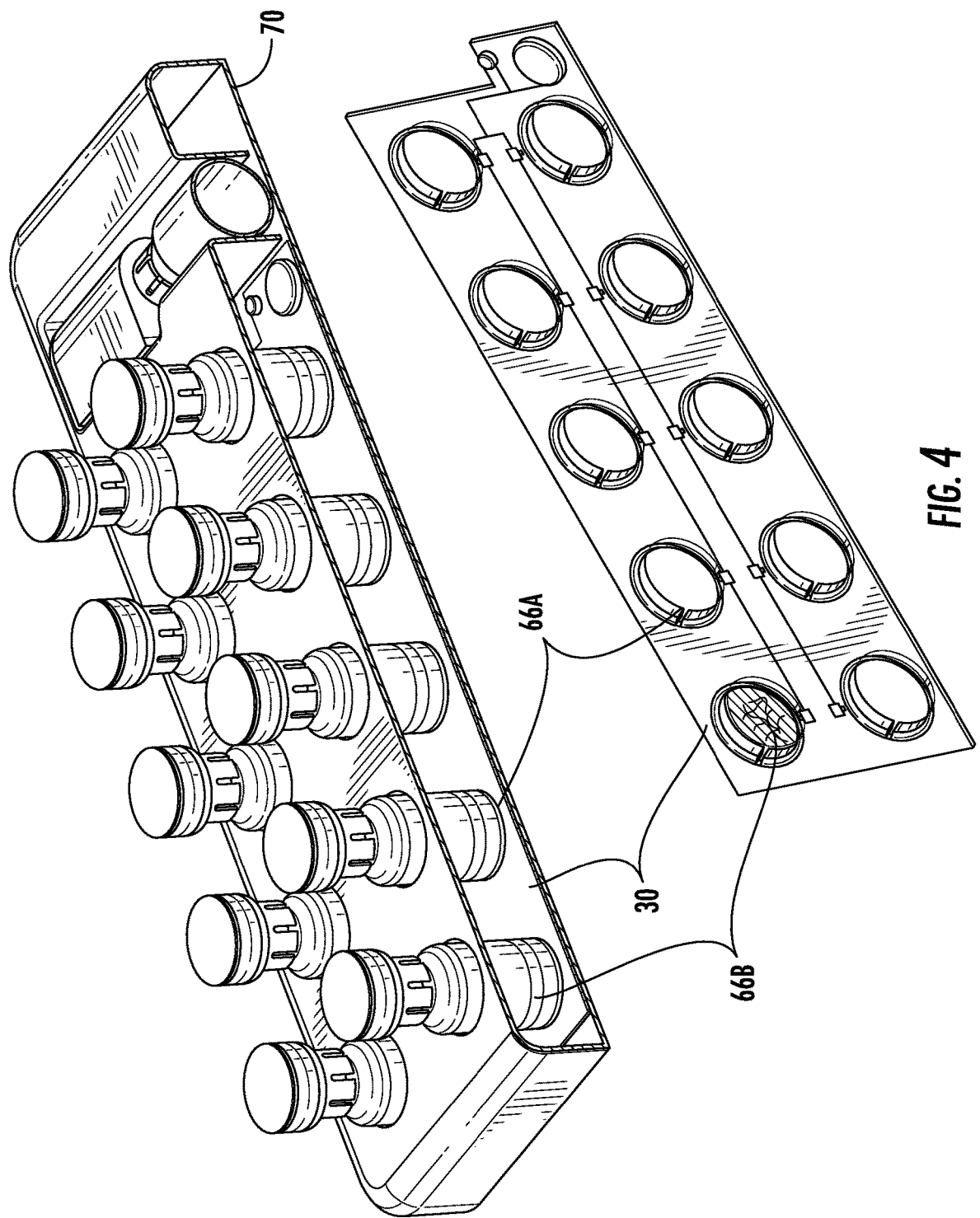
FIG. 4 is a perspective view of a portion of the container monitoring system in accordance with the embodiments of the disclosure.

As shown in FIG. 2, the data collection unit 30 may be configured to have one or more one openings 32 for receiving one or more containers 10. As illustrated, the data collection unit 30 is planar, however, it may have any geometric or non-geometric shape. As discussed below, the data collection unit 30 may be constructed from a flexible material to permit the data collection unit 30 to be shaped or folded as needed, to conform to a plurality of containers 10 as illustrated in FIGS. 1, 4, or to portions of a container 10 as illustrated in FIG. 3, or to a packaging, such as tray 70.

The data collection unit 30 may be manufactured by any means such as thermoforming, additive printing, multi-shot or insert injection molding. In some embodiments, the data collection unit 30 may include a single-sided, double-sided or multilayered printed circuit board (PCB) for mechanically supporting and electrically connecting electrical or electronic components using conductive tracks.

The PCB may have an electronic circuit 50 (including conductive tracks), which may be connected to any one or more of the following components: integrated circuits, conductors, transducers, audio devices (e.g., speaker or sounder), devices for supplying power 62 (e.g., battery), microcontrollers, microprocessors and memory (volatile and/or non-volatile), communication components 64 for one-way or two-way wired or wireless communication (e.g., transmitter/receiver, antennae, near field communication (NFC) technology, radio frequency identification (RFID) technology), and sensors, which may include individual sensors (e.g., 66A, 66B, 66C) and/or a sensor array 66 consisting of a group of sensors deployed in a certain geometric pattern that may be useful for collecting and processing thermal, electromagnetic or acoustic signals. Sensors may include optical devices for receiving or emitting light (e.g., light emitting diodes), heat sensors, such as resistance temperature detector (RTD) and/or platinum resistance thermometer (PRT) 66A and thermochromics sensors 66B, piezoelectric sensors, chemical or gas sensors, electrochemical sensors, such as electrochromic sensors 66C, magnetic field sensor or MEMS, piezoresistive sensor, accelerometers, sound sensors, position and location sensors (e.g., global positioning system, altimeter, gyro sensor) and hygrometers.

In one non-limiting embodiment, the data collection unit 30 includes communications components 64, such as a transceiver capable of wirelessly transmitting and receiving to and from the control device 50, signals indicative of an internal and/or external environmental condition of at least one container 10. The data collection unit 30 and control device 40 may be in one-way or two-way communication.

In one non-limiting embodiment, the data collection unit 30 may be formed from a printable, flexible substrate which may be used as a medium for printing an electronic circuit 50 and/or electronic components as discussed above. In this embodiment, the electronic circuit 50 and/or electronic components are integral to or embedded within the data collection unit 30. Printed components may include a power source 62, communication components 64, sensor array 66 and/or sensors 66A, 66B, 66C. In another one non-limiting embodiment, electronic circuit 50 may include some printed electrical or electronic components, in which event, any additional electrical or electronic components may be coupled to the electronic circuit 50 by hand or by machine. For example, electronic circuit 50 may be printed on the flexible substrate, and at least one sensor (e.g., 66A, 66B, 66C) coupled to the electronic circuit 50 by hand or machine. In this example, the at least one thermal sensor may be arranged on the surface of the data collection unit 30 such that the thermal sensor is exposed to and is able to sense an environmental condition (e.g., temperature) of the container 10 and/or the product.

The flexible, printable substrate may comprise a variety of suitable substances including but not limited to polycarbonate (PC), polyethylene terephthalate (PET), polypropylene (PP), polyvinyl chloride (PVC) and other substrates that allow for uniformity, and low or no deformation when applying stressors such as pressure, temperature or force (e.g., stretching). The substrate may include coatings or additives to control scratch resistance, and dust and moisture accumulation. Methods for printing electronic circuit 50 on the substrate may include non-impact printing (e.g., ink jet printing and thermography printing), impact printing (e.g., screen printing, flexography, lithography, pad, gravure printing) and direct write printing (e.g., nScrypt). Inks useful for printing electronic circuit 50 and interconnecting components, such sensors (e.g., 66A, 66C) to a power source 62, and to communication components 64, may include any one or more inks by way of example, silver-based or copper-based inks, metal nanoparticle inks, carbon-based inks, and organometallic inks. In some embodiments, the control device 40 may be integral to data collection unit 30. For example, the printed electronic circuit 50 may also include the control device 40.

The container monitoring system 100 also includes control device 40. The data collection unit 30 and/or the control device 40 may include software, a central processing unit (CPU or processor), memory or memory components and communication components 64. In some embodiments, data collection 30 and/or the control device 40 may be programmable to permit a user to change the state of at least one sensor of a plurality of sensors, to an on-state or an off-state, and to permit independent sensing of each container removably coupled to the data collection unit 10. For example, a data collection unit 30 may have a plurality of sensors, but a manufacturer need only to monitor temperature. The ability to turn sensors on or off avoids the tracking of unnecessary data.

In another example, a data collection unit may have containers A, B and C that must be maintained at a temperature range of 40° F. and 75° F., and containers D, E, and F that must be maintained at a temperature below 60° F. The six containers could be shipped together, but the parameters for monitoring each set ABC v. DEF may be different. In this example, a measured temperature of 60° F. or above will generate an out-of-range alert for containers DEF, but not for containers ABC.

In one non-limiting embodiment, the control device 40 serves as a communication link between the data collection unit 30 and the external device 50. The communication components 64 may include a Wi-Fi and/or a Bluetooth® low energy communications (BLE) module configured to communicate via point-to-point (e.g., device pairing), one-to-many (e.g., broadcasting) or mesh network. A variety of protocols may be part of the data collection unit 30 and/or the control device 40 including, but not limited to: NB-IoT, eMTC, EC-GSM-IoT, LTE-M, DASH7, NB-FI, LPWAN, Ethernet, SAP, SAS, ATP, Bluetooth, GSM, TCP/IP, WiFi, ZigBee, 6LoWPAN, CAT6 Ethernet, HomePlug. The control device 40 may be coupled to the data collection unit 30 by conductive tracks, by wire or wirelessly.

The external device 50 may include a computer (e.g., desktop computer, laptop computer or tablet) or a portable electronic device (e.g., smart phone, tablet, watch) or a central server or cloud computing system or device that is network connected anywhere in the world. The control device 40 and external device 50 may be in one-way or two-way communication. As discussed above, data communications can be carried out using any of a variety of custom or standard wired or wireless protocols for commercial or residential use. Although described in connection with an exemplary computing system environment, examples of the disclosed embodiments are capable of implementation with numerous other general purpose or special purpose computing system environments, configurations or devices.

Turning to FIG. 2, a portion of the container monitoring system 100 is disclosed in accordance with embodiments of the disclosure. A data collection unit 30 is shown having a plurality of openings 32 for receiving a plurality of containers 10. The data collection unit 30 may have one or more sensors or a sensor array 66, operably coupled to the surface of the data collection unit 30 (e.g., the PCB) or embedded within the data collection unit 30 (e.g., flexible substrate).

As illustrated in FIG. 2, sensors for measuring temperature, such as RTD/PRT 66A, are shown. In some embodiments, the RTD/PRT 66A is mounted within an opening 32 so that the RTD/PRT 66A may have a degree of contact with a container 10. For example, the RTD/PRT 66A may be mounted to at least on inner surface of an opening 32, as shown in FIG. 2. In embodiments, the RTD/PRT 66A may be mounted to a portion of the internal diameter of opening 32. The opening 32 as illustrated in FIG. 2 is generally annular, however, the opening 32 may have any shape or dimension. In other embodiments, the RTD/PRT 66A may be disposed on and/or at an edge of opening 32 as illustrated in FIG. 1. It should be appreciated that the RTD/PRT 66A may be mounted in any of the combination or configuration so long as contact may be made between the RTD/PRT 66A and a container 10.

At least one sensor (e.g., 66A, 66C) and/or sensor array 66, may be operably coupled to a power source 62 via an electronic circuit 50, to receive an electrical signal such as a constant voltage or current. As further discussed below, the applied voltage or current may be used to measure an electrical characteristic (e.g., resistance) of a sensor. For example, the measured electrical characteristic may be indicative of an internal and/or external environmental condition (e.g., temperature) of a container 10, and/or of a product.

In one non-limiting embodiment at least one sensor is disposed on the inner surface of opening 32. The sensor disposed within opening 32 may be a resistive temperature sensor 66A, such as a resistance temperature device or platinum resistance thermometer, as discussed below. When an RTD/PRT 66A is disposed within an opening, and a container 10 is inserted into an opening 32, this results in a degree of contact between the RTD/PRT sensor 66A and the container 10. For example, in FIG. 1, a degree of contact is made directly with the container 10 body, or alternatively, a degree of contact may be made with a cap 12 as illustrated in FIG. 3.

The data collection unit 30 may also include one or more sensors, such as electrochromic sensor 66C as shown in FIG. 1, adapted to display a pre-defined color indicative of a temperature value. An electrochromic sensor 66C includes a material which exhibits an electrochemically-mediated change in an optical property (e.g., color) when placed in a different electronic state, typically being subjected to a voltage change. The electrochromic sensor may be reversible or irreversible. In order to display the indication, the electrochromic sensor 66C may take power/charge from a power source 62. In some embodiments, electrochromic sensor 66C may be indirectly coupled to the container 10 as discussed below, or coupled to the body of container 10 (e.g., to cap FIG. 1, 12).

In one non-limiting embodiment, an electrochromic sensor 66C is operably coupled to the RTD/PRT sensor 66A by an electronic circuit 50. As discussed below, the RTD/PRT sensor 66A may be the source of a change in voltage thereby communicating a value indicative at least one of an internal and external environmental condition (e.g., temperature), to the electrochromic sensor 66C. For a range of temperature values, a pre-defined color may be selected and enabled in the electrochromic sensor 66C. For example, if the value of the temperature from the RTD/PRT sensor 66A falls within a pre-determined temperature limit or range, then such an indication may be displayed on the electrochromic sensor 66C using a green color. And, if the value of the temperature exceeds the pre-determined temperature limit or range, then such an indication may be displayed on the electrochromic sensor 66C using a red color.

In some embodiments, the electrochromic sensor 66C may have various indicators to inform a user. For example, if the temperature value is below a pre-determined temperature limit (e.g., 77° F.), then, the electrochromic sensor 66C displays a green color indicating that the product is safe for use or consumption. If the pre-determined limit is exceeded (e.g., 100° F.), then a red color may be displayed on the electrochromic sensor 66C indicating to the user that the product is unfit for consumption or use. A third color (e.g., yellow) may be displayed when a container 10 is detached from the data collection unit 30. For example, when a data collection unit 30 is returned to the manufacturer, a yellow color will indicate to the manufacturer that the data collection unit 30 may require a quality check (e.g., check for damage, check status of power supply 32, etc.) The data collection unit 30 and/or the control device 40 may be configured to reset a "yellow" condition to a green condition once the data collection unit 30 is ready for reuse.

Referring to FIG. 3, a portion of a container monitoring system 100 is shown in accordance with embodiments of the disclosure. In one non-limiting embodiment, the data collection device 30 may be removably coupled to the cap 12 of one or more containers 10.

Turning to FIG. 4, a portion of a container monitoring system 100 is shown in accordance with embodiments of the disclosure. The data collection unit 30 may conform to the lower portion of a container 10 (e.g., base). For example, the data collection unit 30 may be configured to receive the base of a container 10 such that a lower portion of the container 10 is in communication with RDT/PRT sensor 66A.

In another non-limiting embodiment, the data collection unit 30 may also include a thermochromics sensor 66B, for example, a thermochromics strip. The thermochromics strip can provide another type of visual indicator to show that a container 10 has been touched or that a temperature limit has been reached or exceeded. Generally, a thermochromics strip contains a heat-receptive dye that causes the strip to undergo a change in appearance when exposed to a different temperature. Depending on the thermochromics ink used, the color change may be reversible or irreversible. In one non-limiting embodiment, as shown in FIG. 4, the data collection unit 30, may have a thermochromics sensor 66B (e.g., strip) affixed to the underside of the data collection device 30 to provide a degree of contact between the thermochromics sensor 66B and a container 10. A visual indication of a temperature value may be displayed when the container 10 is removed from the data collection unit 30. In some embodiments, the thermochromics sensor 66B may be affixed to cap 12. For example, thermochromics sensor 66B may be affixed to the top of cap 12 as shown in FIG. 1. In other embodiments, the thermochromics sensor 66B may be wrapped around cap 12, or in an alternative embodiment, wrapped around the body of container 10, as shown in FIG. 4.

Figure 5:
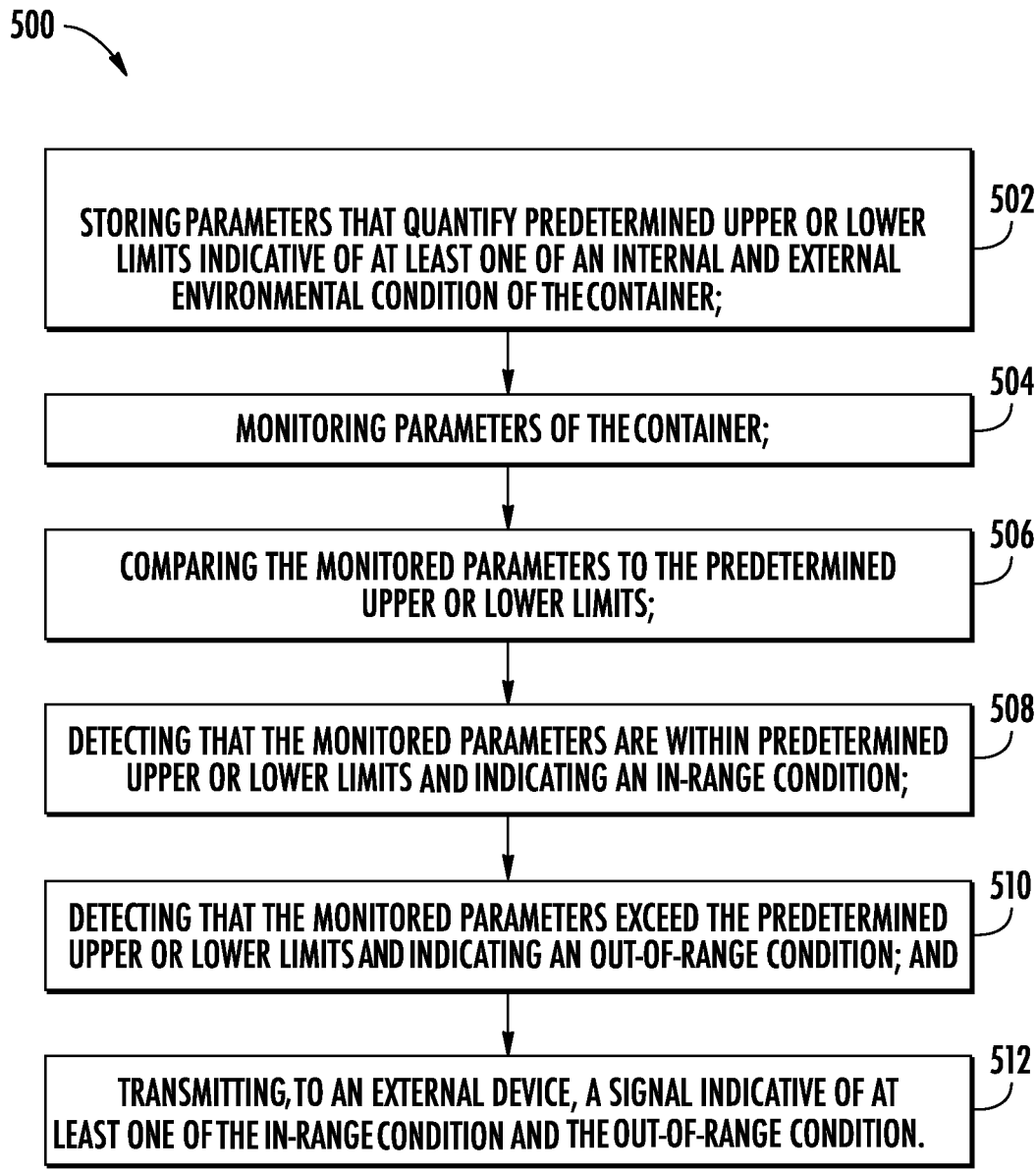
FIG. 5 illustrates a method for monitoring an environmental condition of a container in accordance with embodiments of the disclosure.

Referring to FIG. 5, a method 500 for monitoring an environmental condition of a container is disclosed in accordance with embodiments of the disclosure.

A method for monitoring an environmental condition of a container using a container monitoring system including at least one container removably coupled to a data collection unit, the method including: storing in at least one of a data collection unit and a control device, parameters that quantify predetermined upper or lower limits indicative of at least one of an internal and external environmental condition of the at least one container; monitoring parameters of the at least one container; comparing the monitored parameters to the predetermined upper or lower limits; detecting that the monitored parameters are within predetermined upper or lower limits as indicating an in-range condition; detecting that the monitored parameters exceed the predetermined upper or lower limits as indicating an out-of-range condition; transmitting to an external device, a signal indicative of at least one of an in-range condition and an out-of-range condition.

As discussed above, the container monitoring system 100 is configured to monitor at least one environmental condition of a container 10 that is removably coupled to the data collection unit 30. A manufacturer's guidelines for storage and shipment of environmentally sensitive product can be used with the container monitoring system 100 to ensure that product remains in a usable or consumable condition. For example, a shipping temperature guideline requiring that product be maintained at a temperature below 75° F. or at a temperature range of between 45° C. and 75° C., establish a predetermined environmental parameter for maintaining proper temperature.

In the first step, 502, one or more parameters that quantify predetermined upper or lower temperature limits is stored in the data collection unit 30 and/or the control device 40. A parameter may be a value indicative of any internal and/or external environmental condition of the container 10. In one embodiment, an environmental condition may include temperature. In some embodiments, the data collection unit 30, and/or the control device 40 may be configured to store data pertaining to the one or more parameters, in a memory.

In step 504, the data collection unit 30 and/or the control device 40 may be configured to monitor a plurality of parameters pertaining to at least one container 10 operably coupled to the data collection unit 30. For example, one of the monitored parameters may be temperature. In this example, a thermal sensor, such as a RTD/PRT 66A, may be disposed within an opening 32 of the data collection unit 30 and configured to provide a degree of contact between the thermal sensor and the container 10. In this example, the RTD/PRT 66A typically includes a resistive element, which may be platinum, nickel or copper. The resistive element senses temperature. In general, as the temperature of the resistive element increases, so does the resistance to the flow of electricity. An electrical current, supplied by a power source (e.g., battery) 62 is passed through the RTD/PRT 66A. The resistive element is used to measure the resistance of the current being passed through it. As temperature of the resistive element increases, the electrical resistance also increases. The electrical resistance is measured in ohms (Ω). The resistance value can then be converted into a temperature value based on the characteristics of the container 10 or product to determine at least one of an internal and/or external environmental condition of container 10 and/or product.

By way of example, a container 10 may have a cap 12 with an aluminum crimp. When the crimp has a measured temperature of 10° C. (Celsius), this is generally equivalent to a resistance value of 103.90 ohms. This resistance value may correspond to a temperature of 10.39° C. In some instances corresponding temperature values may be adjusted based on a variety of factors such as the composition of the product (e.g., water-soluble, lipid-soluble, etc.), the container 10, the cap 12, a crimp (if any). The same example may be used to determine an internal temperature (e.g., temperature of the product). For example, when the exterior of a glass container 10 is 13° C., this may be equivalent to a resistance value of 105.07 ohms. When the product is, for example, water-based then this may correspond to an internal temperature of 13.39° C.

In step 506, the monitored parameter (e.g., temperature) is compared to the stored predetermined upper or lower limit for the monitored container 10.

In step 508, the data collection unit 20 and/or the control device 30 may detect whether the monitored parameter for a container 10 is within predetermined upper or lower limits, indicating an in-range condition. Similarly, in step 510, the data collection unit 20 and/or the control device 30 may detect whether the monitored parameter is within predetermined upper or lower limits, indicating an out-of-range condition.

In step 512, the data collection unit 20 and/or the control device 30 may be configured to transmit to an external device 50, a signal indicative of at least one of an in-range condition or an out-of-range condition. For example, when an out-of-range condition is determined, the external device 50 may receive an alert. The alert may provide information such, as temperature variations, date, time, duration, frequency, location (e.g., by GPS, geolocation, NB-IoT technology), etc. In some embodiments, both out-of-range and in-range conditions may be transmitted.

The transmission of in-range and out-of-range conditions may occur continuously while a container 10 is coupled to the data collection unit 10, or periodically. The data collection unit 30 may include a BLE module configured to periodically transmit a signal indicative of at least one of an in-range condition or an out-of-range condition, to control device 40. For example, the data collection unit 30 may be configured to have the power source 62 supply a voltage to a thermal sensor, such as RTD/PRT 66A, every thirty minutes. In this example, the data collection unit 30 may transmit a signal indicative of the measured temperature of the container 10 every thirty minutes. The control unit 40 may then compare the received signal against stored predetermined upper or lower limits, and then store the result (as an in-range or out-of-range condition) in memory. The control device 40 may then be configured to periodically transmit the stored data (e.g., every 6 hours) pertaining to an in-range or out of range condition, to an external device 50. The information transmitted to and received by the external device 50 may be stored in a memory or database. The stored information may be accessible by via an external device interface, such as a web-based application.

While examples of the disclosed embodiments may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit Nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

We claim:

1. A system for monitoring a container environment, the system comprising:
   a control device communicably coupling a data collection unit to an external device, the data collection unit comprising one or more openings for receiving one or more containers and configured to:
   monitor parameters of the at least one container;
   compare the monitored parameters with predetermined upper or lower limits;
   detect that the monitored parameters are within the predetermined upper or lower limits and indicate an in-range condition;
   detect that the monitored parameters exceed the predetermined upper or lower limits and indicate an out-of-range condition; and
   transmit, to the external device, a signal indicative of at least one of the in-range condition and the out-of-range condition, wherein the data collection unit comprises an electronic circuit printed on a flexible substrate.

2. The container monitoring system of claim 1, wherein an environmental condition comprises at least one of a temperature, a humidity, and a pressure.

3. The container monitoring system of claim 1, wherein the data collection unit having a plurality of sensors, is programmable to permit at least one of:
   a user to change the state of one or more sensors to an on-state or an off-state, and
   independent sensing of each container removably coupled to the data collection unit.

4. The container monitoring system of claim 3, wherein at least a first sensor of the plurality of sensors comprises at thermal sensing device.

5. The container monitoring system of claim 4, wherein the thermal sensing device comprises at least one of a resistance temperature detector, a platinum resistance thermometer and an electrochromic sensor.

6. The container monitoring system of claim 5, wherein at least one of the resistance temperature detector and the platinum resistance thermometer is disposed within at least one opening of the data collection unit to provide a degree of contact with at least one container.

7. The container monitoring system of claim 5, wherein the electrochromic sensor is communicably coupled to at least one of the temperature resistance detector and the platinum resistance thermometer.

8. The container monitoring system of claim 1, wherein the external device comprises a computer, a mobile device and a cloud server.

9. The container monitoring system of claim 1, wherein the data collection unit is further configured to:
store in the data collection unit and the control device, parameters that quantify predetermined upper or lower limits indicative of at least one of an internal and external environmental condition of at least one container.

10. An apparatus for monitoring one or more containers in transit, the apparatus comprising:
a data collection unit comprising one or more openings for receiving one or more containers wherein a sensor is disposed in at least one of an interior surface of an opening and an edge of an opening, and the sensor is arranged to monitor the environmental condition of one or more received containers; and
a control device communicably coupled to the data collection unit for transmitting, to an external device, a signal indicative of an environmental condition of the one or more received containers; wherein the data collection unit comprises an electronic circuit printed on a flexible substrate.

11. The apparatus of claim 10, wherein the sensor comprises at least one of a thermal sensor, a humidity sensor, a pressure sensor.

12. The apparatus of claim 11, wherein the thermal sensor comprises at least one of a resistance temperature detector, a platinum resistance thermometer and an electrochromic sensor.

13. The apparatus of claim 10, wherein
a first thermal sensor comprising at least one of the resistance temperature detector and the platinum resistance thermometer, is disposed in the interior surface of the opening and communicably coupled to an electrochromic sensor disposed at the edge of the opening.

* * * * *